United States Patent [19]
DiPietro et al.

[11] Patent Number: 5,197,090
[45] Date of Patent: Mar. 23, 1993

[54] FILM PACKAGE HAVING A POUCH AND LEADER WITH DIFFERENT COEFFICIENTS OF FRICTION

[75] Inventors: Matthew DiPietro, Webster; Thomas J. Kausch; Vincent B. Dethier, both of Rochester, all of N.Y.

[73] Assignee: Eastman Kodak Company, Rochester, N.Y.

[21] Appl. No.: 802,964

[22] Filed: Dec. 6, 1991

[51] Int. Cl.$^5$ .............................................. G03B 42/02
[52] U.S. Cl. ..................... 378/174; 378/182; 354/277; 206/455
[58] Field of Search ............. 378/184, 174, 187, 182; 354/277, 276, 275; 206/455

[56] References Cited
U.S. PATENT DOCUMENTS

| | | | |
|---|---|---|---|
| 4,860,042 | 8/1989 | Tajima et al. | 378/174 |
| 4,876,706 | 10/1989 | Tajima | 378/174 |
| 4,933,696 | 6/1990 | Schmidt et al. | 354/277 |
| 5,008,694 | 4/1991 | Tajima et al. | 378/174 |
| 5,019,849 | 5/1991 | Harrison | 354/308 |
| 5,048,686 | 9/1991 | Kausch et al. | 206/455 |
| 5,101,229 | 3/1992 | DiPietro | 354/277 |

Primary Examiner—David P. Porta
Attorney, Agent, or Firm—Frank Pincelli

[57] ABSTRACT

A package for a stack of film sheets has a pouch that is sealed around the stack of sheets and a leader that is secured to the pouch and engageable with a spindle in a magazine so that rotation of the spindle can pull the pouch from around the stack of sheets. The pouch and leader are formed of different polyolefin materials with the pouch comprising a material having a low coefficient of friction to enable the pouch to be easily pulled around the stack of sheets while the leader comprises a material having a high coefficient of friction to facilitate engagement with the spindle and pulling the pouch uniformly.

6 Claims, 4 Drawing Sheets

FILM PACKAGE HAVING A POUCH AND LEADER WITH DIFFERENT COEFFICIENTS OF FRICTION

CROSS REFERENCE TO RELATED APPLICATION

Reference is made to commonly-assigned copending U.S. patent application Ser. No. 07/802,966, entitled "Package Having A Leader Secured Over A Pouch," filed on even date herewith in the name of Thomas J. Kausch.

BACKGROUND OF THE INVENTION

The present invention relates to a package for enclosing a plurality of sheets of material, such as a stack of x-ray film sheets, with the package having a pouch and leader with different coefficients of friction to facilitate removal of the package from the stack of sheets in a magazine or the like.

It is known to provide a light tight package for holding a stack of sheets of x-ray film or the like. The package may comprise a pouch or bag for holding the sheets, and a leader that projects from an end of the pouch. Such a film package is placed in a magazine having a spindle, and the leader is attached to the spindle. Then the magazine is closed and the spindle rotated to strip the packaging material from the stack of sheets. Packages and magazines generally of the kind described above are disclosed, for example, in U.S. Pat. No. 5,019,849, issued May 28, 1991; in U.S. Pat. No. 5,048,686, issued Sep. 17, 1991 and in Italian Patent No. 1,062,043.

The related application cross referenced above also relates to a package of the kind holding a stack of film sheets and having a leader that is attached to a spindle in a magazine or the like for removing the package material from the stack of sheets. The package of such application has a leader fabricated from a material different from the material used in manufacture of the pouch. The leader is placed over the pouch and secured thereto so that it is positioned entirely over one face of the pouch. U.S. Pat. No. 5,048,686, mentioned above, states at column 4, lines 25-29 that the leader or flap of a package can be made from a material that is stronger and more tear-resistant material than the pouch.

Because the pouch of such a package is pulled away from the stack of sheets along both the top and bottom of the stack, the pouch needs to slide easily relative to the sheets to avoid displacement of the sheets during removal of the pouch. Also, the trailing end of the pouch is pulled through a light lock in some magazines, and the pouch needs to slide easily through the light lock. On the other hand, the leader of the package needs to be tough and durable and also be able to be gripped by the spindle during rotation of the spindle for removing the pouch from the stack of sheets. As a result, the physical characteristics desirable for the pouch to differ from the characteristics needed for the leader.

SUMMARY OF THE INVENTION

An object of the invention is to provide a package comprising a pouch and a leader wherein the pouch will slide easily along the upper and lower sheets of the stack and wherein the leader will produce a uniform pulling force across the width of the pouch when it is attached to the spindle and the spindle is rotated.

In accordance with the present invention, a package for a stack of film sheets has a pouch enclosing the stack of sheets and a leader secured to the pouch. The leader is engageable with a mechanism for removing the pouch from the stack of sheets by pulling the leader away from the stack. The improvement of the invention relates to the pouch comprising a material having a low coefficient of friction to enable the pouch to be pulled from around the stack of sheets while the leader comprises a material different from the pouch and having a higher coefficient of friction than the pouch.

The invention and its objects and advantages will become more apparent in the detailed description of the preferred embodiment presented below.

BRIEF DESCRIPTION OF THE DRAWINGS

In the detailed description of the preferred embodiment presented below, reference is made to the accompanying drawings, in which.

DETAILED DESCRIPTION OF THE PREFERRED EMBODIMENT

Figure 1:
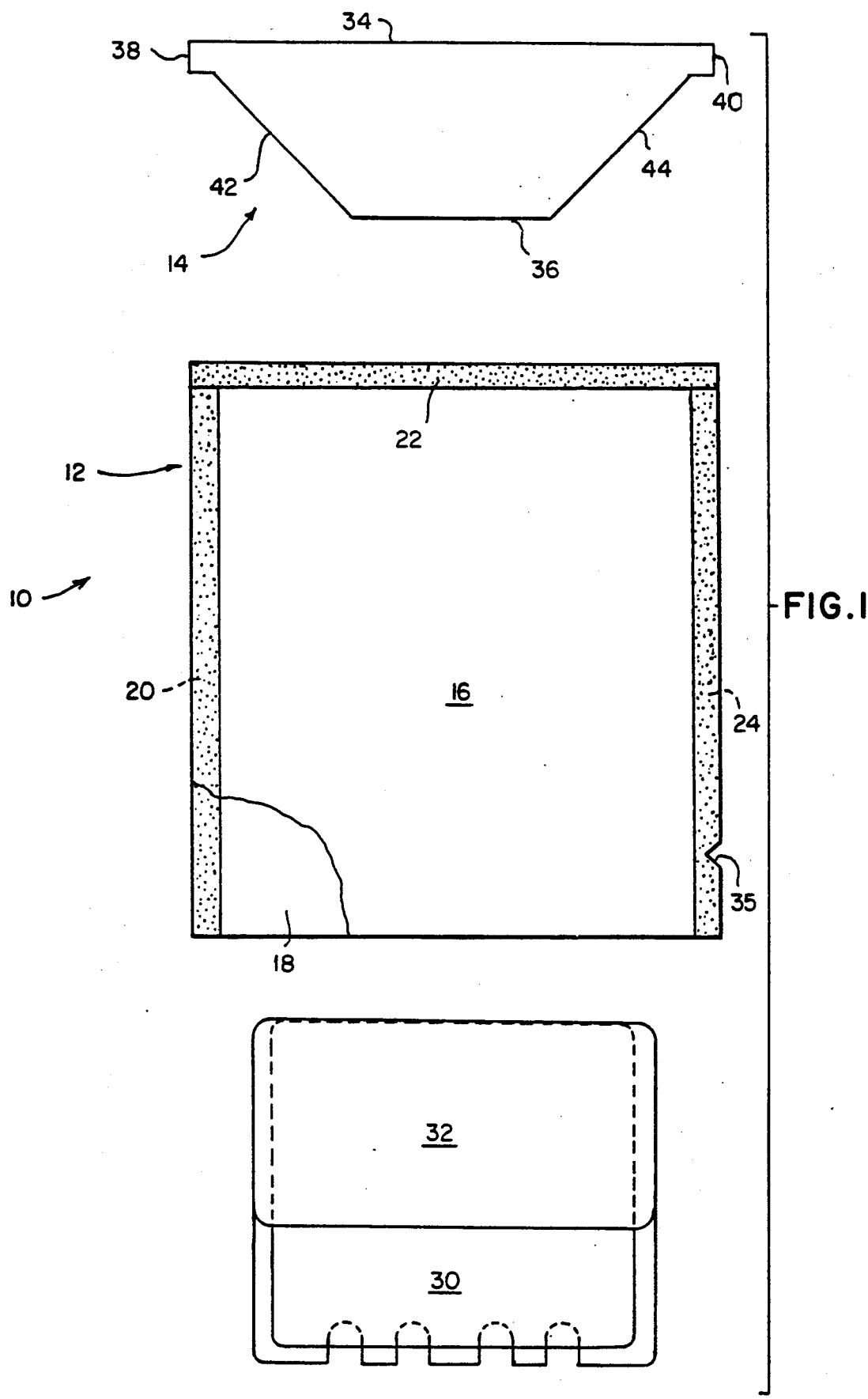
FIG. 1 is an exploded plan view of the package of the invention illustrating the pouch and leader portions of the package prior to attachment of the leader to the pouch and before the stack of film is loaded into the package, and further illustrating a stack of film sheets in a protective carrier positioned for loading into the package.

Referring now to the drawings in detail, a package of the invention is generally designated 10. Package 10 can be constructed in a manner disclosed in the before-mentioned copending U.S. patent application. Accordingly, initially the construction of such a package will be described, followed by a description of package features of the present invention.

Package 10 comprises a pouch 12 and a leader 14. The pouch can be formed from two generally rectangular sheets 16 and 18 (FIGS. 1 and 3) of packaging material. This material will be described in more detail later. The leader is cut from a sheet of a different kind of material.

The sheets 16,18 are of the same size and are located one above the other in generally parallel planes. They are initially secured together along the three side edges thereof, for example by lines of heat sealing designated 20, 22 and 24. Seals 20,24 are at side edges of the pouch while seal 22 is along the top or leading edge of the pouch. Initially, the bottom of the pouch is open, and the stack of film sheets is loaded into the pouch through the open bottom. Then the sheets 16,18 are sealed together at the bottom portion of the pouch by a line of heat sealing 26, for example. This leaves the film in a light tight space 28 (FIG. 3) between the sheets 16 and 18.

Figure 3:
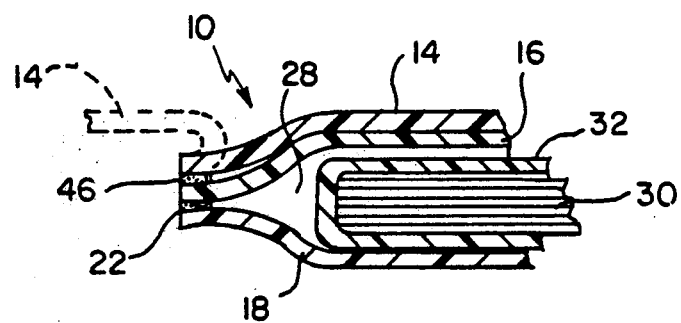
FIG. 3 is an enlarged cross section taken along line 3—3 of FIG. 2.

As best shown in FIGS. 1 and 3, the space 28 receives a stack of film sheets 30, positioned within a U-shaped carrier 32 which protects the film sheets in the package. A notch 35 is provided in a side edge of sheets 16,18 part way through seal 24 to facilitate tearing the sheets 16,18 to remove the lower portion of the package after it is loaded into a magazine.

Leader 14 has first and second end edges 34,36 that are generally parallel to each other, and edge 36 is shorter than edge 34. The leader also has side edges 38,40 that are perpendicular to edge 34 and extend a short distance toward edge 36. More specifically, the length of edges 38,40 is substantially equal to the width of seal line 22. Leader 14 also includes side edges 42,44 that extend from edges 38 and 40 and taper inwardly as they approach edge 36 of the leader. Thus, the width of the leader between side edges 42,44 is less than the width of the edge 34 of the leader.

Figure 2:
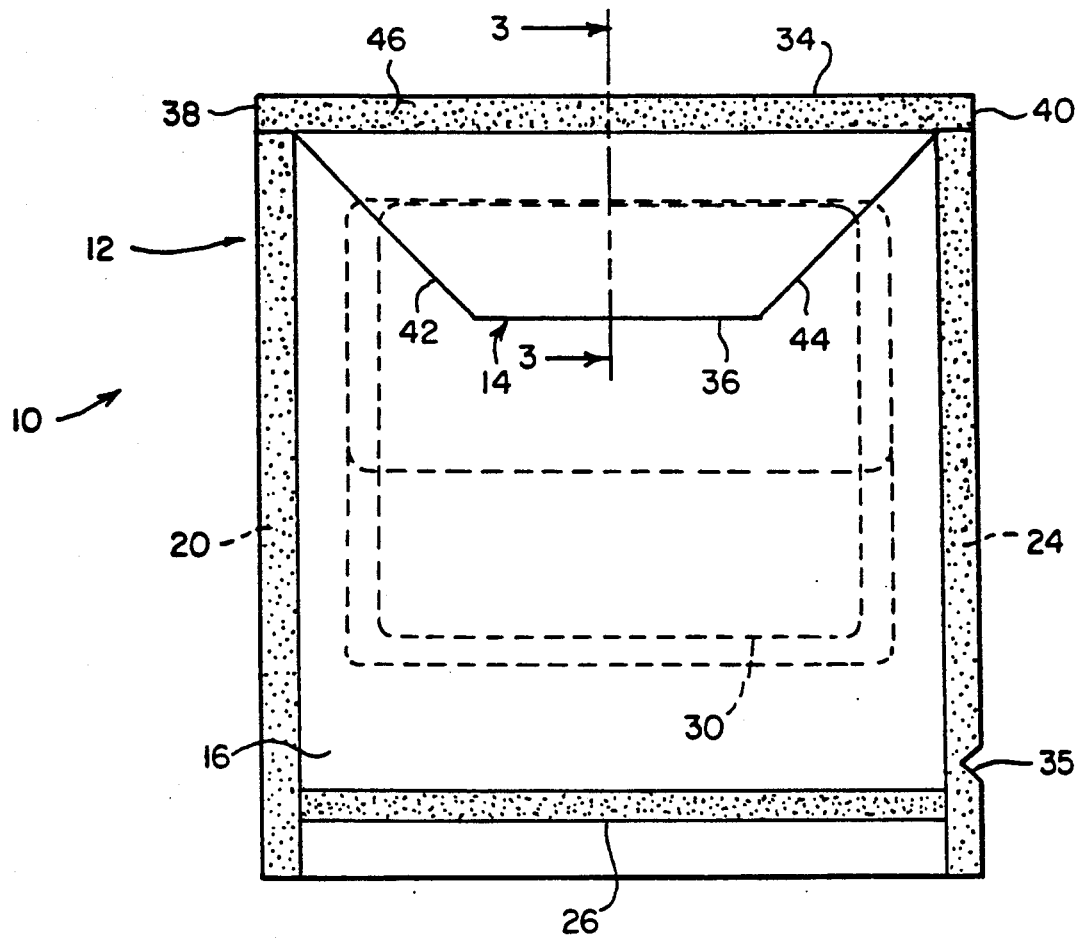
FIG. 2 is a plan view of the package after attachment of the leader and loading of the stack of film and carrier into the package.

After the seals 20, 22 and 24 of the pouch 10 are formed, leader 14 is placed over the top or upper face of sheet 16 as illustrated in FIG. 2 with the strip portion of the leader defined by edge 34 and side edges 38,40 overlying the seal 22. Then the leader is sealed to the pouch by a heat seal line shown at 46 in FIGS. 2 and 3. Heat seal line 46 does not extend into the portion of the leader defined by the tapered sides 42,44. Thus, the portion of the leader between heat seal 46 and edge 36 of the leader is completely unattached to the pouch so that it can be freely lifted from the upper face of sheet 16 and folded over the leading edge of the pouch, as shown in phantom in FIG. 3. This free and unattached portion of the leader can be connected to a spindle or other apparatus used for pulling the packaging material away from the stack of sheets in the carrier board once the package is located in a magazine or the like.

Figure 4:
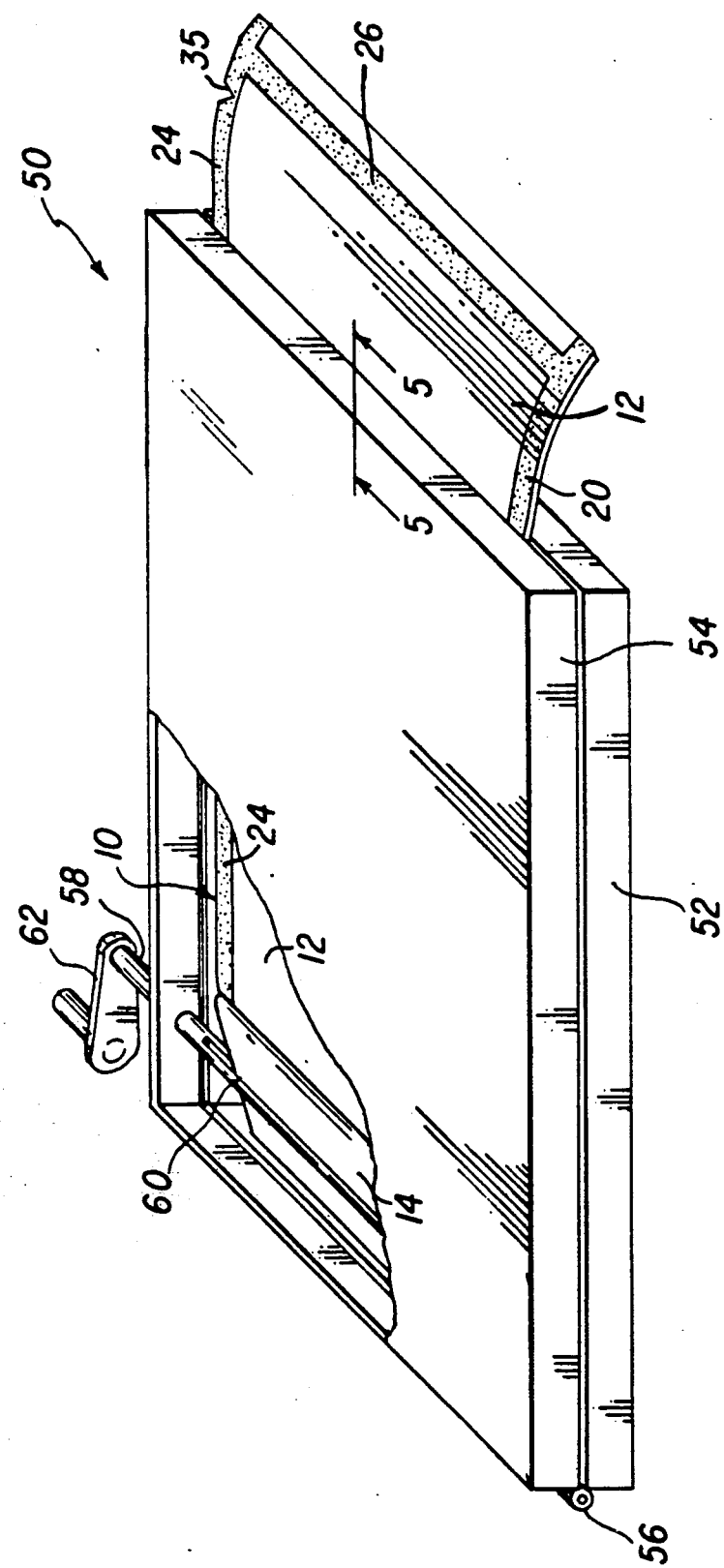
FIG. 4 is a view illustrating the package positioned in a magazine with portions of the magazine being broken away to illustrate a spindle used for removing the package material from the stack of sheets.
Figure 5:
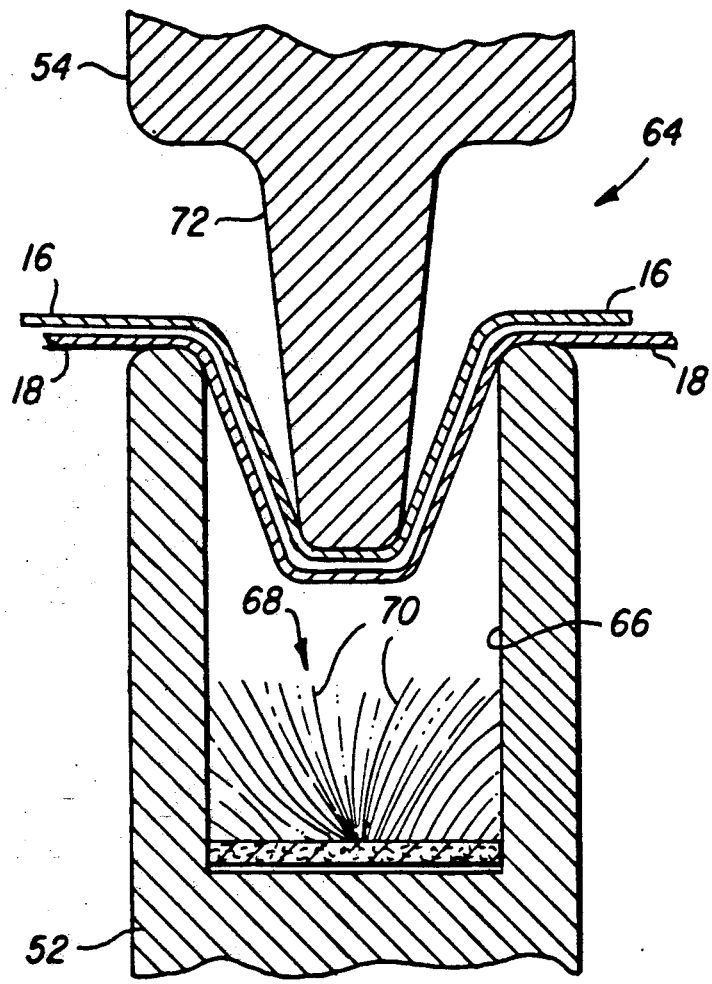
FIG. 5 is an enlarged fragmentary section taken along line 5—5 of FIG. 4.

FIGS. 4 and 5 illustrate package 10 positioned inside a magazine generally designated 50. Magazine 50 can be of the kind disclosed in more detail in U.S. patent application Ser. No. 636,335, filed Dec. 31, 1990 in the name of Matthew DiPietro and entitled "Light Lock". Magazine 50 comprises a base 52 and a cover 54 which are secured together along one side edge by a hinge 56. The cover portion can be swung about hinge 56 from its closed position, illustrated in FIG. 4, to an open position for loading of the film package 10 into the magazine.

The magazine has a spindle 58 supported by the cover 54, and the portion of the spindle within the cover has an elongate slot 60. When the package 10 is positioned within the magazine, the leader 14 is threaded through the slot 60 as illustrated in FIG. 4. The spindle can be rotated, for example by a crank or handle 62 to wind the leader about the spindle. Alternatively, the spindle can be rotated by motor connected to the spindle directly or indirectly, and the spindle can have fingers or other projections which engage and grip the leader 14 for winding the leader and pouch about the spindle.

When the package is initially positioned within the magazine, the portion of the package containing the heat seal line 26 and notch 35 are located outside the magazine, as illustrated in FIG. 4. Once the magazine is closed to form a light tight space within the magazine for the package, the package material comprising sheets 16 and 18 are torn beginning at notch 35 entirely across the width of the package to remove the seal 26. Thus, when the spindle 58 is rotated, the packaging material outside the magazine can be pulled between the base 52 and cover 54 of the magazine into the interior of the magazine.

As illustrated in FIG. 5, there is a light lock generally designated 64 which enables a portion of the magazine to be positioned outside the magazine and pulled to the inside thereof without allowing light to enter the magazine and fog the film. Light lock 64 can be of the kind disclosed in more detail in the before-mentioned U.S. patent application Ser. No. 636,335. More specifically, as illustrated in FIG. 5, the light lock may comprise a generally U-shaped channel 66 that opens to the top of the base of the magazine. A light absorbing material generally designated 68 is seated in the bottom of the channel and includes fibers or bristles 70 that help absorb any light tending to enter the magazine.

Cover 54 has a flange 72 that projects downwardly and part way into the channel 66 in base 52. Thus, when the portion of the pouch outside the magazine, as shown in FIG. 4, is pulled into the magazine in response to rotation of spindle 58, sheets 16,18 of the pouch must pass over the top of the outside flange of the channel 66, then under the flange 72 of the cover and then upwardly and over the inside flange of the channel 66 in a generally U-shaped path. As the spindle is rotated, sheet 16 also is pulled over the top of the stack of film sheets 30 while sheet 18 must travel under the stack of sheets. In order to facilitate this movement of the pouch relative to the magazine and the film, the pouch is made from a material having a low coefficient of friction.

While it is desirable for the pouch to have a low coefficient of friction, the leader must grip and be gripped by the spindle in order to pull the pouch through the magazine and around the stack of film sheets. Therefore the leader is made of a material different from the pouch and one which has a high coefficient of friction so that it will grip the spindle during rotation of the spindle. The relatively higher coefficient of friction of the leader also allows the spindle and leader to exert a more uniform pulling force across the full width of the pouch so that the pouch is moved uniformly across the width of the stack of film sheets.

In a preferred embodiment of the invention, sheets 16,18 of the pouch comprise laminated layers of a polyolefin material including a black modified high density polyethylene layer, and a metalized polyester or metalized oriented polypropylene layer with the black layer comprising the inner surface of sheets 16,18 and the metalized layer comprising the outer surface of the sheets. Material of this kind can be fabricated to have a coefficient of friction in the range of 0.05 to 0.2.

The leader also preferably is made of a polyolefin material, such as a rubber modified high density polyethylene. In the preferred embodiment, the coefficient of friction of the leader is in the range of 0.2 to 1.0 (polyolefin to polyolefin). A material of this kind works well with a spindle shaft made of 60-61 aluminum bar stock having a T-6 hardness.

The construction of the package 10 of the invention readily facilitates the use of materials having different coefficients of friction because the leader is separately fabricated from the pouch material. This enables the leader and pouch to be fabricated of materials that perform the different functions of the leader and pouch, respectively, most efficiently and without compromising the requirements of one or the other, as typically occurs when the leader and pouch are formed from the same material. Because the pouch material is of a low friction material, it can easily be pulled through the light lock 64 and around the stack of film sheets, and this also minimizes the likelihood that the leader could be torn by excessive forces applied by rotation of the spindle. In addition, the specific materials mentioned for the pouch 12 keep the space within the pouch where the film is located light tight and thus prevents fogging of the film.

The invention has been described in detail with particular reference to a preferred embodiment thereof, but it will be understood that variations and modifications can be effected within the spirit and scope of the invention.

I claim:

1. In a package for a stack of film sheets, such as a stack of x-ray film sheets, the package having a pouch enclosing the stack of sheets, and a leader secured to the pouch, the leader being engageable with a mechanism for removing the pouch from the stack of sheets by pulling the leader away from the stack, the improvement wherein the pouch comprises a material having a low coefficient of friction to enable the pouch to be pulled from around the stack of sheets, and wherein the leader comprises a material different from the pouch and having a higher coefficient of friction than the pouch.

2. The invention as set forth in claim 1 wherein the pouch and leader are formed from different polyolefin materials, and the pouch comprises sheets of laminated material having an outer layer of low friction metalized material.

3. The invention as set forth in claim 1 wherein the pouch has a coefficient of friction of about 0.05 to 0.2 and the leader has a coefficient of friction of about 0.2 to 1.0.

4. The invention as set forth in claim 1 wherein the pouch comprises sheets of laminated polyolefin material including an outer layer selected from the group consisting of metalized polyester or metalized oriented polypropylene, and the leader comprises a rubber modified high density polyethylene.

5. The invention as set forth in claim 4 wherein the outer layer of the pouch has a coefficient of friction of about 0.05 to 0.2 and the leader has a coefficient of friction of about 0.2 to 1.0.

6. In a magazine having a space for receiving a package, the package comprising a pouch enclosing a stack of film sheets and a leader secured to the pouch, the magazine having a light lock through which a portion of the pouch extends when the package is initially loaded into the magazine, and the magazine further comprising a rotatable spindle having means for engaging the leader so that rotation of the spindle is effective to wind the leader onto the spindle and pull the pouch through the light lock and from around the stack of sheets, the improvement comprising:

the pouch comprising a material having a sufficiently low coefficient of friction to enable the pouch to be pulled through the light lock and from around the stack of sheets in response to rotation of the spindle, and the leader comprising a material different from the pouch and having a higher coefficient of friction than the pouch, the leader coefficient of friction being related to the spindle so that rotation of the spindle creates a substantially uniform pulling force across the width of the pouch during removal of the pouch from the stack of sheets.

* * * * *